K. B. KILBORN.
METHOD OF AND APPARATUS FOR REMOVING PNEUMATIC TIRES FROM CORES.
APPLICATION FILED MAR. 24, 1921.

1,388,435. Patented Aug. 23, 1921.
2 SHEETS—SHEET 1.

Inventor
Karl B. Kilborn
By R.O. Trogner
Attorney

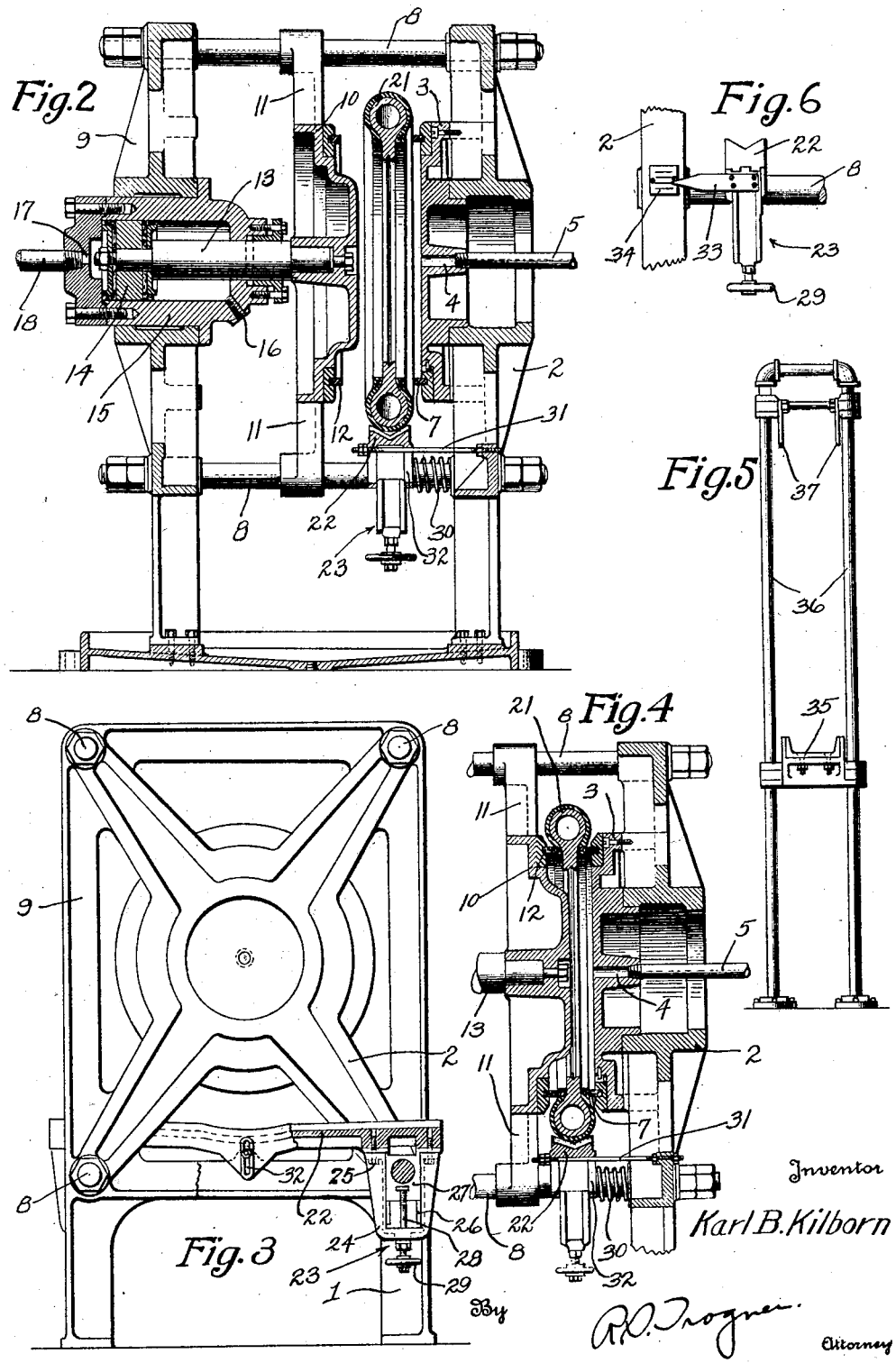

UNITED STATES PATENT OFFICE.

KARL B. KILBORN, OF AKRON, OHIO, ASSIGNOR TO THE GOODYEAR TIRE & RUBBER COMPANY, OF AKRON, OHIO, A CORPORATION OF OHIO.

METHOD OF AND APPARATUS FOR REMOVING PNEUMATIC TIRES FROM CORES.

1,388,435.  Specification of Letters Patent.  Patented Aug. 23, 1921.

Application filed March 24, 1921. Serial No. 455,217.

*To all whom it may concern:*

Be it known that I, KARL B. KILBORN, a citizen of the United States, residing at Akron, in the county of Summit and State of Ohio, have invented new and useful Improvements in Methods of and Apparatus for Removing Pneumatic Tires from Cores, of which the following is a specification.

My invention relates to tire strippers and it has, for its primary object, the provision of a method and apparatus which shall facilitate the removal of a pneumatic tire from its core by loosening the tire thereupon after it has been removed from a mold.

In following the well established practice of building pneumatic tires, a plurality of strips of fabric, impregnated with rubber, are superposed upon relatively heavy metal cores which are disposed in suitable molds where they are subjected to heat to vulcanize the rubber compound. It has been found that despite precautionary measures to prevent the tire from adhering to the core, some difficulty is experienced in removing the tire from the core after it has been molded.

One object of my invention, therefore, resides in providing an apparatus which shall facilitate the removal of a pneumatic tire from its core and obviate the danger of impairing the interior surface of the tire when it is removed from its forming core.

Other and ancillary objects will be apparent from the following detailed description of the accompanying drawings which illustrate my invention in a preferred form as it is reduced to practice.

In the drawings, Figure 1 is a side elevational view of a tire stripping apparatus constructed in accordance with my invention;

Fig. 2 is a sectional view taken substantially along the line 2—2 of Fig. 1;

Fig. 3 is an end elevation of a portion of the apparatus illustrated in Fig. 1;

Fig. 4 is a transverse sectional view, parts being broken away, illustrating a position of certain of the parts of the apparatus, presented in the previous figures, during an operation performed in the loosening of a tire upon its forming core;

Fig. 5 is an elevational view showing a guide or track which is utilized in properly disposing a tire and its core in the apparatus set forth in the previous figures; and Fig. 6 is a detail view showing an adjusting means and gage which is of advantage in properly adjusting certain parts of the apparatus to accommodate tires of various sizes.

Figure 1:
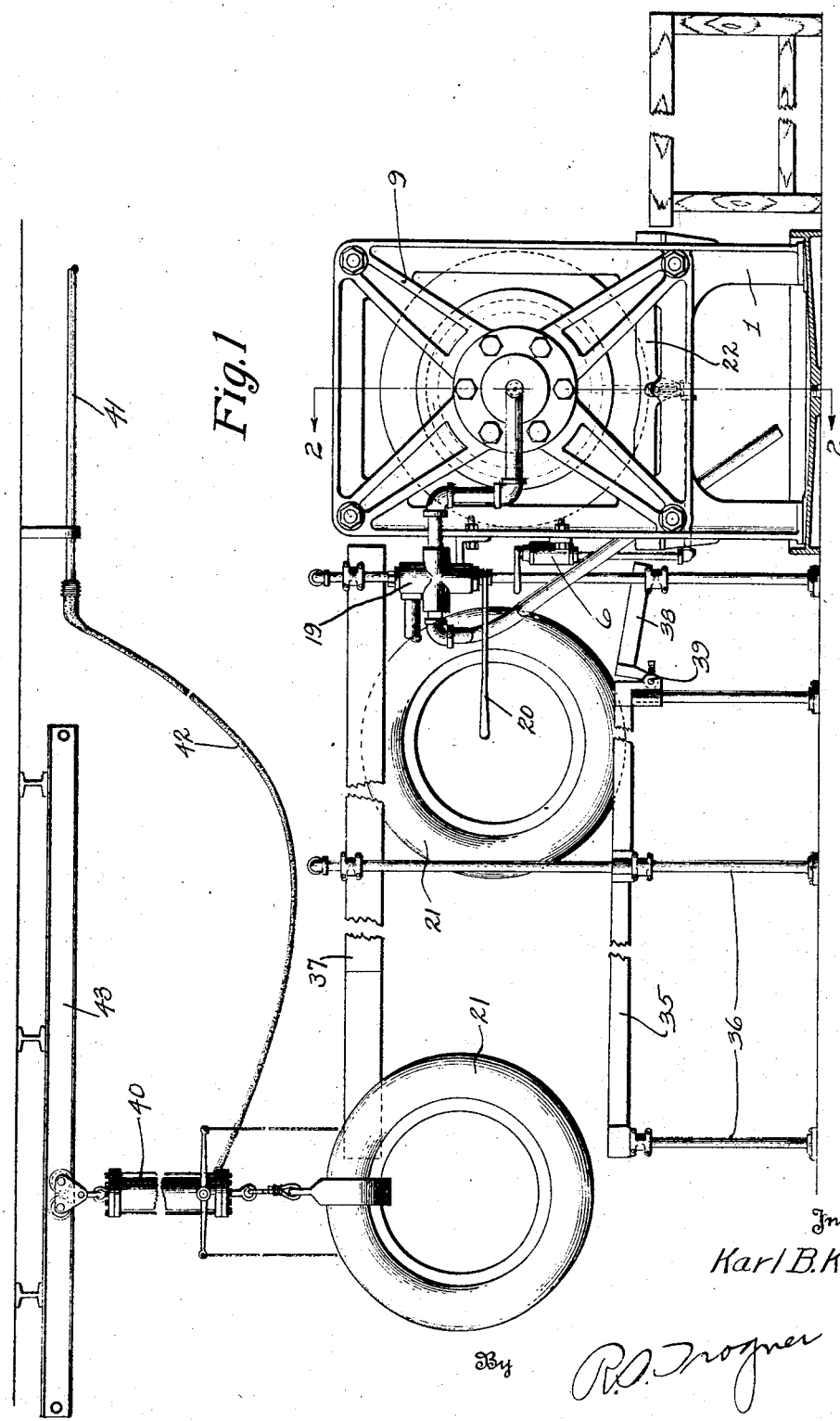

In practising my invention, an apparatus is provided comprising, broadly, a plurality of platens or pressure members which are adapted to engage a tire, that is disposed between them upon its forming core, to form an air tight chamber into which air is forced, whereby the air is subsequently forced between the tire and its forming core. Suitable means is also utilized to support the tire between the platens and means for guiding the tire with its core upon the supporting means is employed to facilitate handling the relatively heavy object.

In order to insure a clear understanding of my invention, reference may be had to the drawing in which is shown a frame 1 supporting a spider 2 to which a platen or pressure member 3 is secured. The platen 3 is provided with a central opening 4 into which is fitted a conduit 5 connected by a suitable valve 6 to an air line. The platen 3 is stationary and is provided with an annular gasket 7 formed of any suitable resilient material, such as rubber. The spider 2 is connected by a plurality of rods 8 to a similar spider 9 secured to the frame 1. A movable platen 10 is slidably mounted upon the rods 8 by means of arms 11 and is provided with an annular gasket 12 similar to that upon the stationary platen 3. The platen 10 is suitably secured to a piston 13 which has a double faced piston head 14 snugly fitted within a cylinder 15. The cylinder 15 is provided with openings 16 and 17 in opposite ends thereof and a conduit 18 is fitted within the opening 17 to connect a source of fluid under high pressure to one end of the cylinder while a suitable connection is fitted within the opening 16 to connect the other end of the cylinder to fluid under low pressure.

Since my invention is not concerned with the particular mechanism for admitting the operating fluid to the cylinder 15, a detailed description of the control mechanism therefor is not essential to a complete understanding of the features of my invention. However, a valve mechanism 19 is conventionally shown in the drawings, which is controlled by a lever 20 to admit both high and low pressure fluids to the cylinder 15, as will be appreciated from the following description.

In order to support a tire and its core 21 between the pressure platens 3 and 10, a track or supporting member 22 is disposed upon a plurality of the rods 8 and an adjusting mechanism 23 is utilized to compensate for different sizes of tires to insure that they be centrally positioned between the platens. The adjusting device consists of a frame 24 of U-shape which is secured to the support 22 by bolts 25 and is supplied with guides 26 adapted to slide in channels provided in a block 27 mounted upon one of the rods 8. A screw 28, having a hand wheel 29, is adapted to raise or lower the frame 24 and, consequently, the support 22. The support is maintained in a proper central position between the platens by means of a spring 30 mounted upon one of the rods 8 between the member 22 and the spider 2. The spring forces the support 22 against the retaining nut of a bolt 31 which is extended through an elongate opening 32 in the member 22 and through a similar opening in the spider 2.

In order to expedite adjusting the support 22 to the proper position to maintain a tire centered between the platens 3 and 10, an indicator is utilized comprising a pointer 33 which is secured to the member 24 and moves over a plate 34 secured to the spider 2. The plate is suitably marked to indicate the relative position of the member 22.

Since the forming core upon which the tire is molded is relatively heavy, it is an advantage to provide means for supporting or guiding the tire and its core to position upon the supporting member 22. For accomplishing this purpose, I have provided a track 35 which is supported by a framework 36, also carrying guide members 37. An end 38 of the track, which is adjacent the support 22, is pivoted to the remainder of the track, as indicated at 39, to provide an inclined surface for the tire and its core to ride down to the supporting member between the pressure platens.

In order to provide means for elevating the tire and its core to a position upon the track 35, I utilize a pneumatic hoist 40 which is connected to an air line 41 by means of a flexible conduit 42 and is supported upon an overhead track 43.

In operating the apparatus above described, the supporting member 22 is first adjusted to the proper position to insure centering of a tire of the size to be operated upon and the tires and their cores are elevated to rest upon the track 35 so they may be rolled upon the supporting member 22. Assuming that a tire and its core has been positioned upon the member 22, the valve 19 is operated by means of the lever 20 to admit fluid under pressure to the cylinder 15. A low pressure liquid is preferably admitted through the opening 16 to the forward working face of the piston head 14 and fluid under high pressure is admitted through the conduit 18 to the rear working face of the head. As will be appreciated, the high pressure is admitted first to advance the platen 10 into engagement with the tire 21, which also presses it firmly against the platen 3, the resilient gaskets 7 and 12 engaging the respective sides of the tire adjacent its bead portions. After the platens have been firmly forced into place, air is admitted by means of the valve 6 through the conduit 5 to the substantially air tight chamber formed by the two platens in the space inclosed by the tire. The air being forced into the chamber thus formed seeks an outlet and, following the line of least resistance, enters between the tire casing and the core, since the engagement therebetween is less firmly made than between the resilient gaskets and the side walls of the tire. When the film of air enters between the side walls of the tire and its forming core, the tire is, of course, released from any adhesion to the core and may consequently be readily removed therefrom by means of a suitable tool.

When the air pressure has been maintained in the chamber for a short time, it is shut off and at the same time the lever 20 is again operated to release the high pressure fluid and to admit the low pressure fluid to the face of the piston head 14, thereby causing it to be retracted within the cylinder to draw the platen 10 away from engagement with the tire. The tire and the core is then pushed from between the platens upon a suitable receiving table, such as shown in the drawing, and the segmental core is removed from the tire.

Although I have shown and described an apparatus and a method of operating it, which embodies my invention, it will be appreciated that minor changes may be made in the construction of the apparatus and in the manner of operating it, without departing from the spirit or scope of my invention and I desire, therefore, that no limitations shall be imposed except such as are indicated in the appended claims.

What I claim is:

1. A tire stripper comprising means for supporting a tire and its core and means for forcing a fluid between the tire and the core.

2. A tire stripper comprising means for supporting a tire and its core in a vertical plane and means for forcing a fluid between the tire and the core.

3. A tire stripper comprising means for adjustably supporting a tire and its core in a vertical plane and means for forcing a fluid between the tire and the core.

4. A tire stripper comprising means for adjustably supporting a tire and its core in a vertical plane, means for guiding the tire to position upon the support and means for forcing air between the tire and the core.

5. A tire stripper comprising means for supporting a tire and its core, a track for guiding the tire to the supporting means, means for elevating the tire to the track and means for forcing air between the tire and the core.

6. A tire stripper comprising means for supporting a tire and its core, means for forming a substantially air tight chamber within the space inclosed by the tire and means for forcing air into the chamber whereby the air is forced between the tire and its core.

7. A tire stripper comprising means for supporting a tire and its core, means for engaging the tire and forming a substantially air tight chamber in the space inclosed by the tire and means for forcing air into the chamber whereby the air is forced between the tire and the core.

8. A tire stripper comprising a stationary platen, a movable platen, means for supporting a tire and its core between the platens, means for causing the platens to form an air tight chamber in the space inclosed by the tire and means for forcing air into the chamber whereby the air is forced between the tire and the core.

9. A tire stripper comprising a stationary platen, a movable platen, a resilient annular member mounted upon each platen, means for supporting a tire and its core between the platens, means for effecting engagement of the resilient members with the tire and means for forcing air between the platens to effect a release of the tire from its core.

10. A tire stripper comprising a stationary platen, a movable platen, a resilient annular member mounted upon each platen, means for adjustably supporting a tire and its core between the platens, a track for guiding the tire upon the supporting means, means for elevating the tire upon the track, means for effecting engagement of the resilient members with the tire and means for forcing air between the platens to effect a release of the tire from its core.

11. A method of loosening a tire from its forming core that comprises forming a substantially air tight chamber in the space inclosed by the tire and forcing air under pressure into the chamber.

12. A method of loosening a tire from its forming core that comprises supporting the tire and its core between a plurality of pressure platens, effecting engagement of the platens with the side walls of the tire and forcing air between the platens whereby the air is forced between the tire and its core.

In witness whereof I have hereunto signed my name in the presence of two subscribing witnesses.

KARL B. KILBURN.

Witnesses:
J. E. KEATING,
PHILIP S. BARNES.